(12) United States Patent
Johnsen et al.

(10) Patent No.: US 9,054,886 B2
(45) Date of Patent: Jun. 9, 2015

(54) SYSTEM AND METHOD FOR USING A MULTICAST GROUP TO SUPPORT A FLOODING MECHANISM IN A MIDDLEWARE MACHINE ENVIRONMENT

(75) Inventors: Bjørn Dag Johnsen, Oslo (NO); Martin Paul Mayhead, Hindhead (GB); Ola Tørudbakken, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 73 days.

(21) Appl. No.: 13/546,217

(22) Filed: Jul. 11, 2012

(65) Prior Publication Data

US 2013/0016718 A1 Jan. 17, 2013

Related U.S. Application Data

(60) Provisional application No. 61/506,557, filed on Jul. 11, 2011.

(51) Int. Cl.
*H04L 12/28* (2006.01)
*H04L 12/18* (2006.01)
(Continued)

(52) U.S. Cl.
CPC ............ *H04L 12/1863* (2013.01); *H04L 49/10* (2013.01); *H04L 12/1836* (2013.01); *H04L 67/2814* (2013.01); *H04L 12/5696* (2013.01); *H04L 12/64* (2013.01); *H04L 12/6402* (2013.01)
USPC .......................................................... 370/392

(58) Field of Classification Search
CPC . H04L 12/64; H04L 12/6402; H04L 12/5696; H04L 49/10

USPC ......... 370/389, 390, 392, 400, 401, 412, 428, 370/429, 419, 395.53, 395.21
See application file for complete search history.

(56) References Cited

U.S. PATENT DOCUMENTS

| 6,038,233 A | 3/2000 | Hamamoto |
| 6,148,336 A | 11/2000 | Thomas |

(Continued)

FOREIGN PATENT DOCUMENTS

| EP | 1 128 607 A2 | 8/2001 |
| EP | 2160068 A1 | 3/2010 |
| WO | 2012037518 | 3/2012 |

OTHER PUBLICATIONS

International Searching Authority at the European Patent Office, International Search Report and Written Opinion for PCT International Application No. PCT/US2012/046225, Oct. 11, 2012, 10 pages.

(Continued)

*Primary Examiner* — Ajay Cattungal
(74) *Attorney, Agent, or Firm* — Tucker Ellis LLP

(57) ABSTRACT

A system and method can support a flooding mechanism using a multicast group in a middleware machine environment. The middleware machine environment can comprise a gateway instance that includes an external port for receiving one or more data packets from an external network. The middleware machine environment also comprises one or more host servers, each of which is associated with one or more virtual machines that can process the data packets. Furthermore, said host servers can provide virtual interfaces that belong to a virtual hub associated with the gateway instance. At least one said packet is a flooded packet that is specified with an unknown destination address when it is received at the external port. The gateway instance operates to send the flooded packet to the multicast group that operates to forward the flooded packet to one or more said host servers in the multicast group.

19 Claims, 5 Drawing Sheets

(51) Int. Cl.
*H04L 29/08* (2006.01)
*H04L 12/933* (2013.01)
*H04L 12/54* (2013.01)
*H04L 12/64* (2006.01)

(56) References Cited

U.S. PATENT DOCUMENTS

| | | | |
|---|---|---|---|
| 6,308,148 | B1 | 10/2001 | Bruins |
| 6,826,694 | B1 | 11/2004 | Dutta |
| 6,912,520 | B2 | 6/2005 | Hankin et al. |
| 6,941,350 | B1 | 9/2005 | Frazier |
| 6,981,025 | B1 | 12/2005 | Frazier et al. |
| 6,999,956 | B2 | 2/2006 | Mullins |
| 7,113,995 | B1 | 9/2006 | Beukema et al. |
| 7,290,277 | B1 | 10/2007 | Chou et al. |
| 7,409,432 | B1 | 8/2008 | Recio |
| 7,536,409 | B2 | 5/2009 | Barcia |
| 7,689,535 | B2 | 3/2010 | Bernard |
| 7,702,649 | B1 | 4/2010 | Bresch et al. |
| 7,721,324 | B1 | 5/2010 | Jackson |
| 7,843,906 | B1 | 11/2010 | Chidambaram |
| 7,870,146 | B2 | 1/2011 | Babb et al. |
| 7,873,611 | B2 | 1/2011 | Ebersole |
| 7,894,440 | B2 | 2/2011 | Xu |
| 7,984,082 | B2 | 7/2011 | Heider et al. |
| 2002/0016858 | A1 | 2/2002 | Sawada |
| 2004/0028047 | A1 | 2/2004 | Hou |
| 2004/0037279 | A1* | 2/2004 | Zelig et al. .................. 370/390 |
| 2004/0123142 | A1 | 6/2004 | Dubal et al. |
| 2005/0100033 | A1* | 5/2005 | Arndt et al. .................. 370/412 |
| 2006/0248200 | A1 | 11/2006 | Stanev |
| 2006/0294493 | A1 | 12/2006 | Melby |
| 2007/0022479 | A1 | 1/2007 | Sikdar et al. |
| 2007/0073882 | A1 | 3/2007 | Brown |
| 2007/0280104 | A1 | 12/2007 | Miyoshi |
| 2008/0137528 | A1 | 6/2008 | O'Toole |
| 2008/0159277 | A1 | 7/2008 | Vobbilisetty |
| 2008/0163124 | A1 | 7/2008 | Bonev |
| 2009/0019505 | A1* | 1/2009 | Gopalakrishnan et al. ... 725/109 |
| 2009/0073895 | A1 | 3/2009 | Morgan |
| 2009/0080328 | A1 | 3/2009 | Hu |
| 2009/0222558 | A1 | 9/2009 | Xu et al. |
| 2009/0262741 | A1 | 10/2009 | Jungck |
| 2009/0281982 | A1 | 11/2009 | Nigul et al. |
| 2010/0008291 | A1* | 1/2010 | LeBlanc et al. .............. 370/328 |
| 2010/0054129 | A1 | 3/2010 | Kuik |
| 2010/0103837 | A1 | 4/2010 | Jungck |
| 2010/0138532 | A1 | 6/2010 | Glaeser |
| 2010/0257269 | A1 | 10/2010 | Clark |
| 2010/0275199 | A1 | 10/2010 | Smith et al. |
| 2010/0287548 | A1 | 11/2010 | Zhou et al. |
| 2010/0306408 | A1* | 12/2010 | Greenberg et al. ........... 709/238 |
| 2011/0023108 | A1 | 1/2011 | Geldermann et al. |
| 2011/0131447 | A1 | 6/2011 | Prakash et al. |
| 2011/0239268 | A1 | 9/2011 | Sharp |
| 2011/0246669 | A1 | 10/2011 | Kanada et al. |
| 2011/0268117 | A1* | 11/2011 | Davis .......................... 370/390 |
| 2011/0299537 | A1 | 12/2011 | Saraiya et al. |
| 2012/0103837 | A1 | 5/2012 | Wall |
| 2012/0131225 | A1 | 5/2012 | Chiueh et al. |
| 2012/0147894 | A1 | 6/2012 | Mulligan |
| 2012/0173757 | A1 | 7/2012 | Sanden |
| 2012/0265976 | A1 | 10/2012 | Spiers |
| 2012/0278804 | A1 | 11/2012 | Narayanasamy |
| 2012/0291028 | A1 | 11/2012 | Kidambi et al. |
| 2012/0307826 | A1 | 12/2012 | Matsuoka |
| 2012/0314706 | A1 | 12/2012 | Liss |
| 2012/0320929 | A9* | 12/2012 | Subramanian et al. ....... 370/419 |
| 2012/0331127 | A1 | 12/2012 | Wang |
| 2012/0331142 | A1 | 12/2012 | Mittal et al. |
| 2013/0232492 | A1 | 9/2013 | Wang |
| 2014/0115584 | A1 | 4/2014 | Mudigonda |
| 2014/0223431 | A1 | 8/2014 | Yoshimura |

OTHER PUBLICATIONS

International Searching Authority at the European Patent Office, International Search Report and Written Opinion for PCT International Application No. PCT/US2012/046219, Mar. 1, 2013, 10 pages.
Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.
Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.
International Search Report dated Sep. 26, 2013 for Application No. PCT/US2013/040656, 10 pages.
International Search Report dated Sep. 23, 2013 for Application No. PCT/US2013/040639, 10 pages.

* cited by examiner

SYSTEM AND METHOD FOR USING A MULTICAST GROUP TO SUPPORT A FLOODING MECHANISM IN A MIDDLEWARE MACHINE ENVIRONMENT

CLAIM OF PRIORITY

This application claims priority to U.S. Provisional Patent Application No. 61/506,557, entitled "SYSTEM AND METHOD FOR USING UNICAST AND MULTICAST FLOODING MECHANISMS TO PROVIDE EoIB GATEWAY vNICs" filed Jul. 11, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The application is related to the following patent applications, which are hereby incorporated by reference in its entirety:

U.S. patent application Ser. No. 13/546,236, entitled "SYSTEM AND METHOD FOR USING A PACKET PROCESS PROXY TO SUPPORT A FLOODING MECHANISM IN A MIDDLEWARE MACHINE ENVIRONMENT", filed Jul. 11, 2012;

U.S. patent application Ser. No. 13/546,261, entitled "SYSTEM AND METHOD FOR SUPPORTING A SCALABLE FLOODING MECHANISM IN A MIDDLEWARE MACHINE ENVIRONMENT", filed Jul. 11, 2012;

U.S. patent application Ser. No. 13/546,368, entitled "SYSTEM AND METHOD FOR SUPPORTING DIRECT PACKET FORWARDING IN A MIDDLEWARE MACHINE ENVIRONMENT", filed Jul. 11, 2012; and U.S. patent application Ser. No. 13/546,405, entitled "SYSTEM AND METHOD FOR SUPPORTING VIRTUAL MACHINE MIGRATION IN A MIDDLEWARE MACHINE ENVIRONMENT", filed Jul. 11, 2012.

FIELD OF THE INVENTION

The present invention is generally related to computer systems and software such as middleware, and is particularly related to supporting a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein are systems and methods for using a multicast group to support a flooding mechanism in a middleware machine environment. The middleware machine environment can comprise a gateway instance that includes an external port for receiving one or more data packets from an external network. The middleware machine environment also comprises one or more host servers, each of which is associated with one or more virtual machines that can process the data packets. Furthermore, said host servers can provide virtual interfaces that belong to a virtual hub associated with the gateway instance. At least one said packet is a flooded packet that is specified with an unknown destination address when it is received at the external port. The gateway instance operates to send the flooded packet to the multicast group that operates to forward the flooded packet to one or more said host servers in the multicast group.

DETAILED DESCRIPTION

Described herein is a system and method for providing a middleware machine or similar platform. In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Middleware Machine Environment

Figure 1:
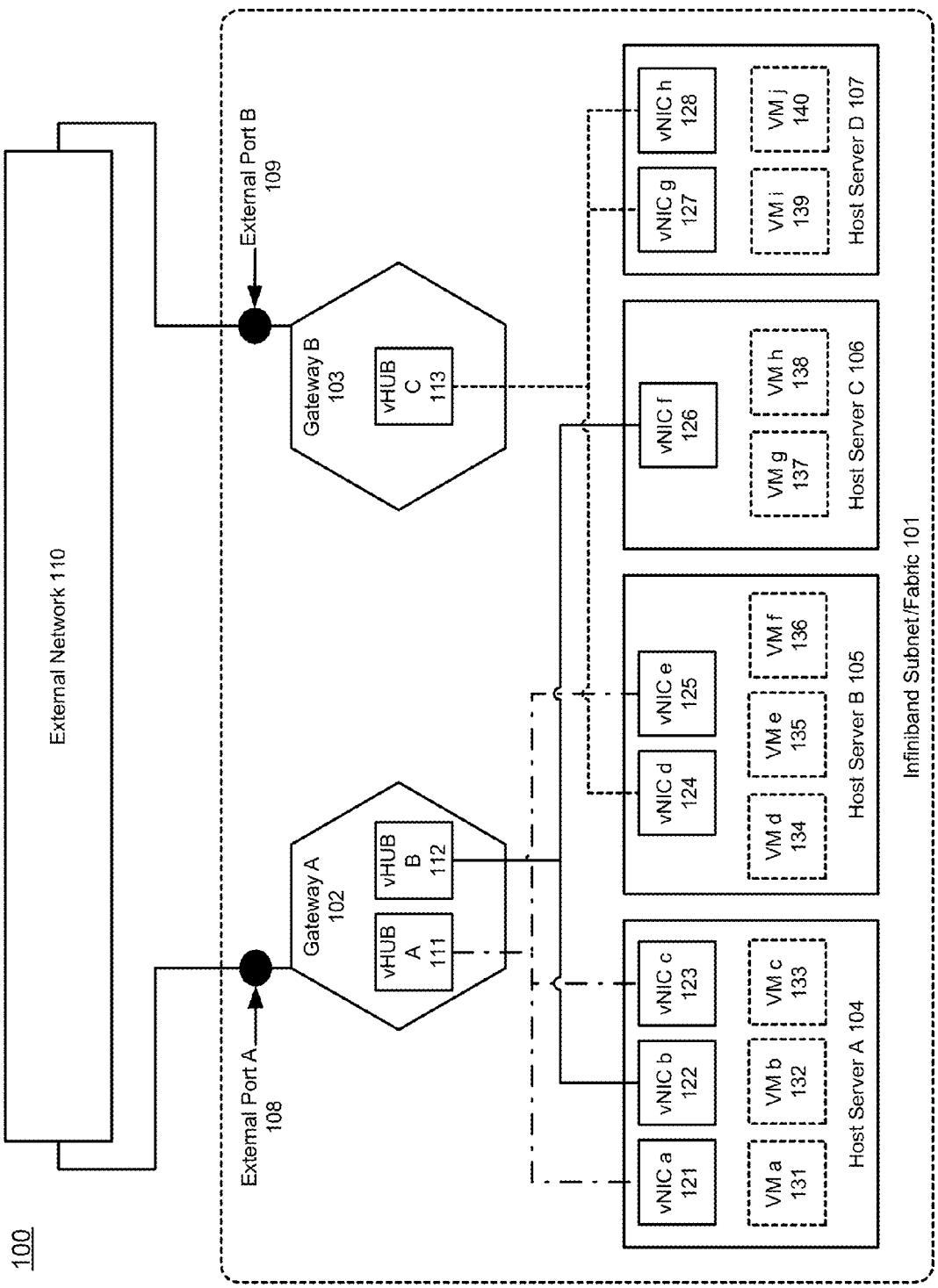
FIG. 1 shows an illustration of a middleware machine environment, in accordance with an embodiment of the invention.

FIG. 1 shows an illustration of a middleware machine environment, in accordance with an embodiment of the invention. As shown in FIG. 1, a middleware machine environment 100 can include an IB fabric 101 that connects to an external network 110 using one or more gateway instances 102-103. The IB fabric also includes a plurality of host servers 104-107 (each of which can be hardware itself or software running on top of a physical host server), which contains a plurality of virtual machines (VMs) 131-140. Each gateway instance A-B 102-103 can be associated with an external port 108-109 that can receive data packets from the external network 110. As shown in FIG. 1, external port A 108 is associated with gateway instance A 102, and external port B 109 is associated with gateway instance B 103.

Additionally, the host servers provides a plurality of virtual interfaces, such as virtual network interface cards (vNICs) 121-128, for receiving data packets from the external network via the gateway instances A-B 102-103. The gateway instances 102-103 can define and maintain one or more virtual hubs (vHUBs) 111-113, each of which defines a logical layer 2 (L2) link on the IB fabric side that contains vNICs associated with the same gateway instance. Furthermore, the vNICs and the hosts that belong to the same vHUB can communicate with each other without involving the associated gateway instance.

As shown in FIG. 1, vHUB A 111 on gateway A is associated with vNIC a 121 and vNIC c 123 on host server A, and vNIC e 125 on host server B. Also, vHUB B 112 on gateway A is associated with vNIC b 122 on host server A and vNIC f 126 on host server C; and vHUB C 113 on gateway B is associate with vNIC d 124 on host server B, and vNIC g 127 and vNIC h 128 on host server D.

Figure 2:
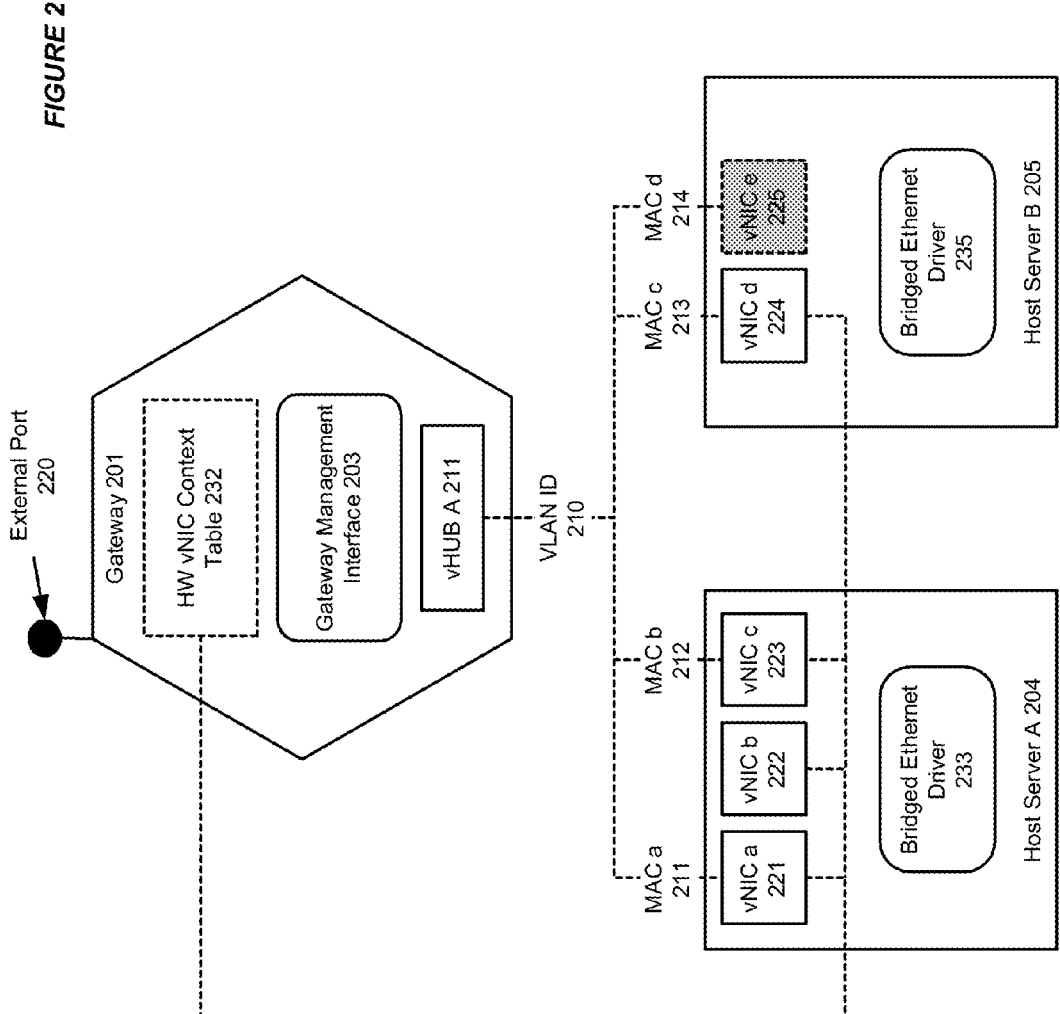
FIG. 2 shows an illustration of a virtual hub (vHUB) that includes various vNICs in a middleware machine environment, in accordance with an embodiment of the invention.

FIG. 2 shows an illustration of a virtual hub (vHUB) that includes various vNICs, in accordance with an embodiment of the invention. As shown in FIG. 2, a middleware machine environment 200 includes a gateway instance 201 and several host servers 204-205 or hypervisors. The gateway instance 201, which comprises an external port 220, can maintain a virtual hub (vHUB), vHUB A 211. The vHUB A 211 can be assigned with a unique virtual LAN ID (VLAN ID) 210. Additionally, the vHUB A 211 can include various vNICs 221, 223-225, each of which is assigned with a Media Access Control (MAC) address 211-214. Each logical vNIC 221, 223-225 can be represented by a MAC/VLAN ID combination associated with a specific Host Channel Adaptor (HCA) port.

A vNIC in the IB fabric can be uniquely identified using a virtual Ethernet interface (VIF), which includes a combination of a VLAN ID and a MAC address. Also, when the VIFs are used concurrently in the same vHub in a gateway instance, different MAC addresses are used for the different VIFs. Additionally, the system can perform an address translation from an Ethernet layer 2 MAC address to an IB layer 2 address that uses local identifier (LID)/global identifier (GID) and queue pair number (QPN).

Furthermore, the gateway instance 201 can include a hardware vNIC context table 232, which contains various entries or hardware vNIC contexts. The hardware vNIC context table 232 can be stored in a memory of the gateway instance 201. When a host driver is sending packets to the external Ethernet via the IB fabric and the gateway 201, this hardware vNIC context table 232 can be used to verify that the correct source address information is used by the correct host. The hardware context table 232 can also be used to look up the correct host HCA port address on the IB fabric and QPN within that HCA, when packets are received by the gateway from the external Ethernet. Additionally, the hardware vNIC contexts can be used to directly steer packets for a specific logical vNIC to a dedicated receive queue in the designated host context/memory.

The gateway instance 201, which can be hardware itself or a software running on top of a hardware switch, allows the use of network managed vNIC allocation. The management interface 203 on the gateway instance 201, e.g. a NM2-GW service processor, can be used to allocate hardware vNIC contexts on behalf of specific host (HCA) ports.

A single vNIC in the IB fabric may or may not be allocated with a hardware vNIC context recorded in the hardware vNIC context table 232. In the example as shown in FIG. 2, vNIC a 221, vNIC b 222, and vNIC c 223 on host server A 204, and vNIC d 224 on host server B 205, can be provided with a hardware vNIC context (i.e. the gateway instance 201 can obtain the correct host HCA port address on the IB fabric and QPN within that HCA for an incoming data packet). Additionally, vNIC e 225 on host server B 205 is not allocated with hardware vNIC context 232 and can only be used in a bridged Ethernet context. In one example, if the complete gateway hardware vNIC contexts in the hardware vNIC context table 232 are consumed by the network managed vNICs, e.g. vNICs a-d 221-224, then all bridge based vNICs, e.g. vNIC e 225, can be flooding based (i.e. not having any dedicated HW vNIC context).

A flooding mechanism can be used to scale the number of logical vNICs beyond the size of the gateway HW vNIC context table. Using the flood-based vNICs, the system allows the same amount of receive queues on the host(s) to receive packets for a large number of logical vNICs. Furthermore, using a flooding mechanism, the system allows schemes where hardware vNIC contexts can be established in the hardware context table 232 after initial packet traffic from the external Ethernet has been received.

Using a Multicast Group to Support a Flooding Mechanism

In accordance with one embodiment of the present invention, when a data packet with an unknown destination is posted on a network switch in a middleware machine environment, a multicast group can be used to support a flooding mechanism in order to assure that the data packet can be properly handled.

Figure 3:
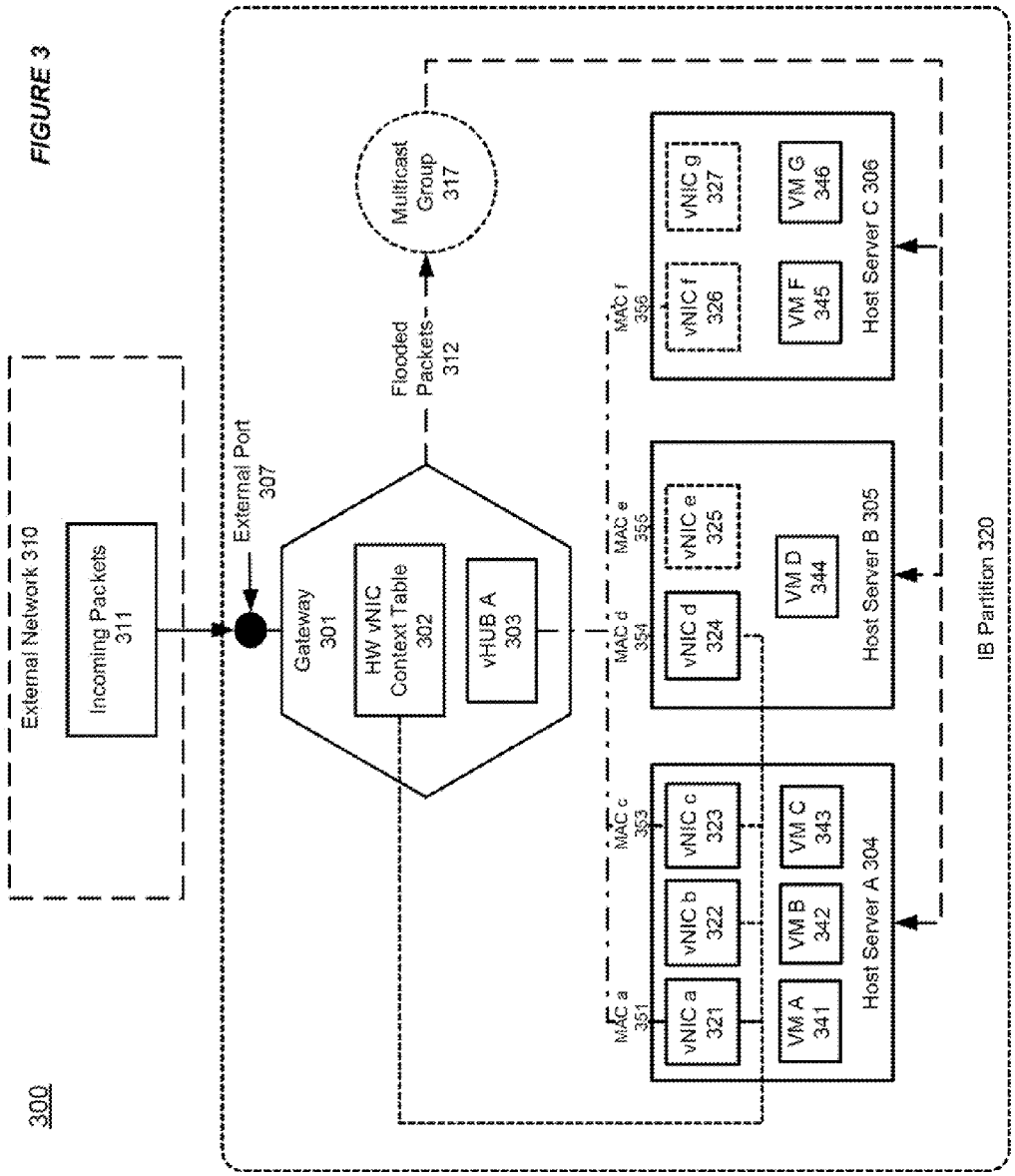
FIG. 3 shows an illustration of a middleware machine environment that uses a multicast group to support a flooding mechanism, in accordance with an embodiment of the invention.

FIG. 3 shows an illustration of using a multicast group to support a flooding mechanism in a middleware machine environment, in accordance with an embodiment of the invention. As shown in FIG. 3, a middleware machine environment 300 can comprise a gateway instance 301 that connects to an external network 310.

The gateway instance 301 can include an external port 307 that is adapted to receive one or more incoming data packets 311 from the external network 310. Additionally, the middleware machine environment 300 also comprises one or more host servers A-C 304-306, each of which can be associated with one or more virtual machines (VMs) 341-346 that operate to process the data packets received from the external network. The host servers A-C 304-306 can provide a plurality of virtual interfaces a-g 321-327, among which the virtual interfaces a 321 and c-f 323-326 belong to a virtual hub, e.g. vHUB A 303 in the gateway instance 301. Each of the virtual interfaces a 321 and c-f 323-326 in the virtual hub A 303 can be associated with different a MAC address, e.g. MAC a 351 and c-f 353-356 respectively.

The gateway instance 301 can determine whether an incoming packet received at the external port specifies a virtual interface that is associated with a context in the hardware context table 302. If the virtual interface specified in the incoming packet is not associated with any hardware context in the hardware context table 302, then the gateway instance 301 can consider that the incoming packet received at the external port 307 has an unknown destination address, in which case the gateway instance 301 can treat this data packet as a flooded packet 312 and relying on a flooding mechanism to properly handled the flooded packet 312.

In accordance with an embodiment of the invention, a dedicated multicast (MC) group 317 in a single IB partition 320 can be used to assure that the data packet 312 can be properly handled. The MC group 317 allows various hosts A-C 304-306 and/or hypervisors that are associated with a virtual hub, e.g. vHUB A 303, to register with the MC group 317 and become a member of the MC group 317. Then, when a flooded packet 312 is received at the gateway instance 301, the gateway instance 301 can send a copy of the flooded packet 312 to each member of the MC group 317, which in turn can distribute the flooded packet 312 to various virtual machines that are running on top of it. Thus, the MC group 317 can include one or more hosts 304-306 and/or hypervisors on the different physical servers. For example, the MC group 317 may include all hosts and/or hypervisors that share the gateway instance 301, and the flooded packet 312 is replicated to all cooperating physical host servers 304-306.

Additionally, a virtual machine on a host server can be associated with multiple different virtual interfaces. In the example as shown in FIG. 3, VM D 344 is associated with vNIC e 325 and vNIC d 324. Here, vNIC e 325 is a flood based virtual interface, and vNIC e 324 is a hardware vNIC context based virtual interface. Using the flooding mechanism based on a MC group 317, the flooded packet 312 may be delivered twice to the same physical host, host server B 305, since one copy is received on each specific interface, vNIC e 324 and vNIC e 325. In such a case, the VM D 344 can filter out additional copies of the flooded packet 312 and ensure that only one copy of the flooded packet 312 is received and process the flooded packet 312 accordingly, in a way that is similar to how a system deals with multiple physical NICs connected to the same logical Ethernet subnet.

Figure 4:
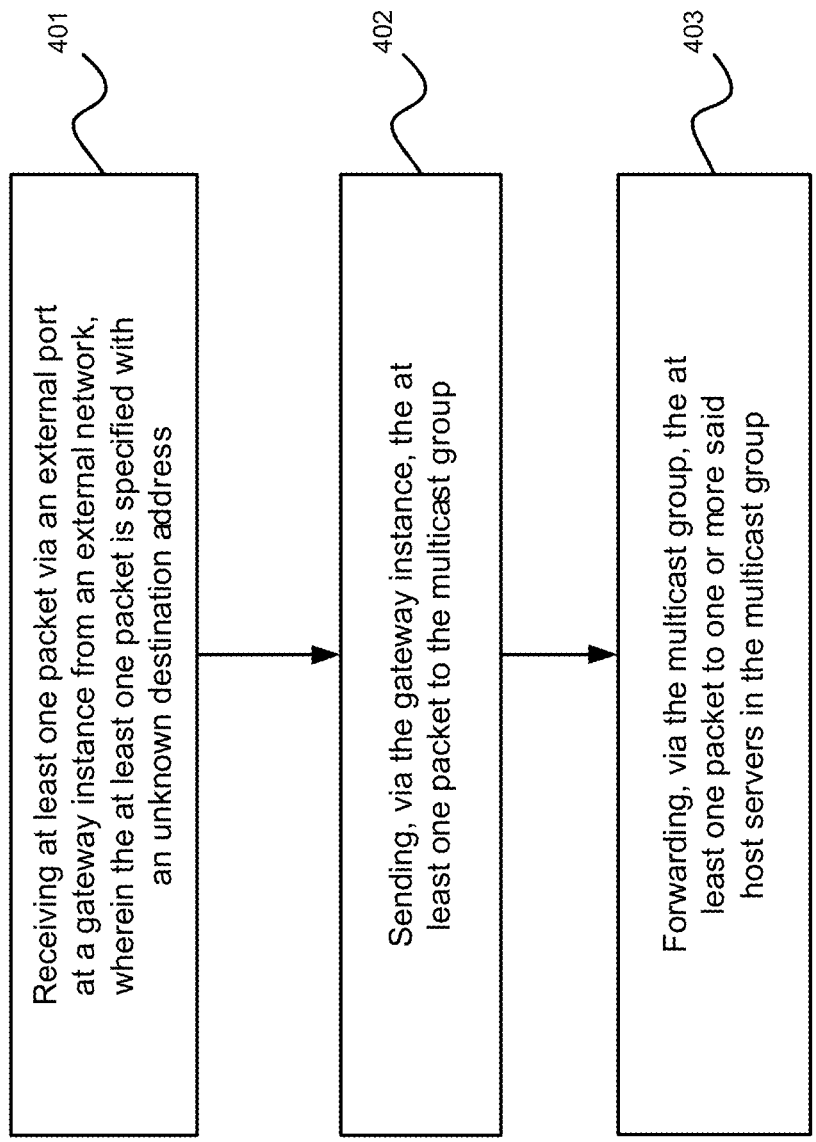
FIG. 4 illustrates an exemplary flow chart for using a multicast group to support a flooding mechanism in a middleware machine environment, in accordance with an embodiment of the invention.

FIG. 4 illustrates an exemplary flow chart for using a multicast group to support a flooding mechanism in a middleware machine environment, in accordance with an embodiment of the invention. As shown in FIG. 4, at step 401, an external port at a gateway instance can receive at least one packet from an external network, wherein the at least one packet is specified with an unknown destination address. Then, at step 402, the gateway instance can send the at least one packet to a multicast group. Additionally, at step 403, the multicast group can forward the at least one packet to one or more said host servers in the multicast group.

Allocating Different Types of vNICs

Figure 5:
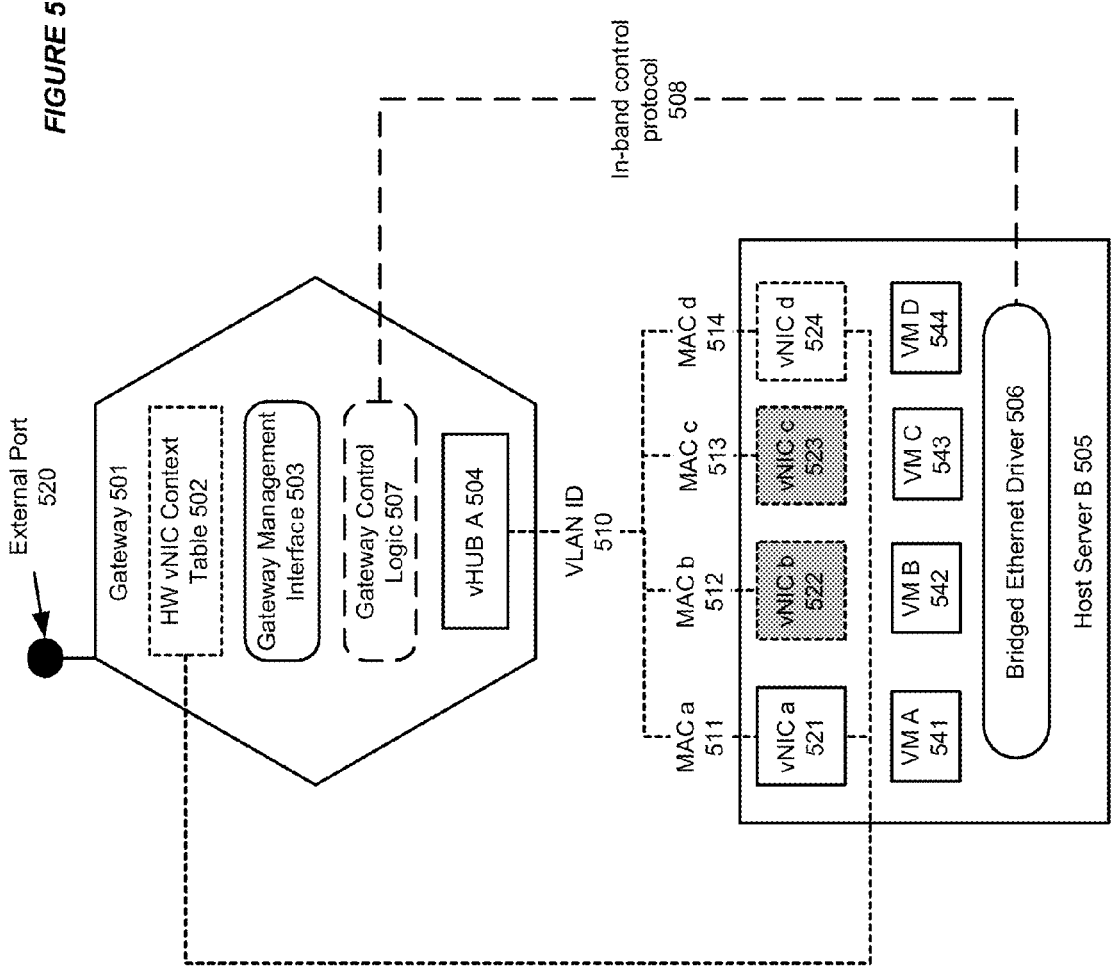
FIG. 5 shows an illustration of allocating different types of vNICs in a middleware machine environment, in accordance with an embodiment of the invention.

FIG. 5 shows an illustration of allocating different types of vNICs in a middleware machine environment, in accordance with an embodiment of the invention. As shown in FIG. 5, a middleware machine environment 500 includes a gateway instance 501 and various host servers and/or hypervisors, e.g. a host server B 505 with VMs A-D 541-544. The gateway instance 501, which comprises an external port 520, can maintain a virtual hub, vHUB A 504. The vHUB A 504 can be assigned with a unique virtual LAN ID (VLAN ID) 510. Additionally, the vHUB A 504 can include various vNICs, e.g. vNIC a-d 521-524, each of which is assigned with a MAC address, e.g. a-d 511-514.

In order to optimize performance and reduce flooding overhead for dealing with shared queues, a parent vNIC, e.g. vNIC a 521, can be allocated via a gateway management interface 503. Additionally, multiple child vNICs, e.g. vNICs b-d 522-524, can be created by a designated host driver, e.g. a bridged Ethernet driver 506 on the host server 505, via the in-band control protocol 508 between the host driver 506 and the gateway control logic 507.

The parent vNIC a 521, which is based on hardware context in the hardware vNIC context table 502, can be allocated by using attributes/metadata specified via the gateway management interface 503. The information for creating the parent vNIC a 521 can be stored as metadata within the gateway control logic 507. Additionally, the metadata for the parent vNIC a 521 can define different policies that impose restrictions on VLAN and MAC address ranges, which can be used by the child vNICs b-d 522-524.

The bridged Ethernet driver 506 can allocate the child vNICs, e.g. vNIC d 524, with dedicated hardware vNIC context in the hardware vNIC context table 502 for specific VIFs (MAC/VLAN), e.g. MAC d 514. Such decisions can be made based on explicitly controlled caching policies, e.g. a per VM SLA policy. Furthermore, when a flooding mechanism is used, the hardware context for a single parent vNIC a 521 can be used by the child vNICs b-c 522-523 to send packets without source address verification. All sharing physical hosts/hypervisors can trust each other, and the external Ethernet network can have the required VLAN.

Furthermore, the gateway instance 501 can handle the connectivity of different types vNICs, e.g. harware contect based vNICs a 521 and d 524 and flooding based vNICs b-c 522-523, in a way similar to handling conventional physical NICs. In one example, the gateway instance 501 can handle an extreme use case that includes a combination of a large number of para-virtualized and/or time shared VMs per physical server and also a large number of VLANs per VM. Furthermore, the granularity of multi-tenant provisioning of the system can be set up so that only a single tenant can use a single flood address hardware resource in the gateway instance.

In accordance with an embodiment of the invention, at least one virtual interface, e.g. vNIC a 521 on a gateway instance 501, is a parent virtual interface that is associated with one or more child virtual interfaces, e.g. vNICs b-d 522-524. The parent vNIC a 521 can be configured with different policy information that limits the set of MAC address and VLAN IDs that the related child vNICs b-d 522-524 can be associated with. Additionally, the parent vNIC a 521 can be provided with a context in a hardware context table 502, and at least one child virtual interfaces, e.g. vNICs b-c 522-523, may not be associated with any context in the hardware context table.

In general, the invention relates to a system for supporting a flooding mechanism in a middleware machine environment operable on one or more microprocessors, comprising:

means for receiving at least one packet via an external port at a gateway instance from an external network, wherein the at least one packet is specified with an unknown destination address; and means for sending, via the gateway instance, the at least one packet to a multicast group; and means for forwarding, via the multicast group, the at least one packet to one or more said host servers in the multicast group.

Said system further comprises means for providing a hardware context table that contains a plurality of contexts that can be associated with one or more said virtual interfaces.

Said system further comprises means for determining, via the gateway instance, whether an incoming packet received at the external port specifies a virtual interface that is associated with a context in the hardware context table.

Said system further comprises means for receiving an incoming packet at the external port that is considered to have an unknown destination address when the incoming packet is destined for a virtual interface that is not associated with any context in the hardware context table.

Said system further comprises means for allowing the multicast group to include all hosts and/or hypervisors that share the gateway instance, and the at least one packet is replicated to all cooperating host servers.

Said system further comprises means for allowing, via the gateway instance, one or more associated hosts and/or hypervisors to register with the multicast group.

Said system further comprises means for associating at least one said virtual machine on a host server with multiple virtual interfaces, and wherein the multicast group operates to forward multiple copies of the at least one packet to the at least one said virtual machine.

Said system further comprises means for allowing the at least one said virtual machine to filter out additional copies of the at least one packet.

Said system further comprises means for allowing at least one virtual interface to be a parent virtual interface that is associated with one or more child virtual interfaces, wherein the parent virtual interface is associated with a context in a hardware context table, and each of the one or more child virtual interfaces is not associated with any context in the hardware context table.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting a flooding mechanism in a middleware machine environment operable on one or more microprocessors, comprising:

a gateway instance, wherein the gateway instance is associated with an external port that is adapted to receive one or more data packets from an external network;

a plurality of virtual interfaces on one or more host servers, wherein each said host server is associated with one or more virtual machines that operate to process the one or more data packets;

wherein at least one packet is specified with an unknown destination address when it is received at the external port of the gateway instance, wherein the gateway instance operates to send said at least one packet to a multicast group, and wherein the multicast group operates to forward the at least one packet to one or more said host servers in the multicast group;

wherein at least one virtual interface is a parent virtual interface that is associated with one or more child virtual interfaces; and wherein policy information associated with the parent virtual interface on the gateway instance limits addresses and/or identifications with which the one or more child virtual interfaces can be associated.

2. The system according to claim 1, further comprising:
a hardware context table that contains a plurality of contexts that can be associated with one or more said virtual interfaces.

3. The system according to claim 2, wherein:
the gateway instance operates to determine whether an incoming packet received at the external port specifies a virtual interface that is associated with a context in the hardware context table.

4. The system according to claim 3, wherein:
the incoming packet received at the external port is considered to have an unknown destination address when the incoming packet is destined for a virtual interface that is not associated with any context in the hardware context table.

5. The system according to claim 1, wherein:
the multicast group includes all hosts and/or hypervisors that share the gateway instance, and the at least one packet is replicated to all cooperating host servers.

6. The system according to claim 1, wherein:
the gateway instance allows one or more associated hosts and/or hypervisors to register with the multicast group.

7. The system according to claim 1, wherein:
at least one said virtual machine on a host server is associated with multiple virtual interfaces, and wherein the multicast group operates to forward multiple copies of the at least one packet to the at least one said virtual machine.

8. The system according to claim 7, wherein:
the at least one said virtual machine operates to receive only one copy of the at least one packet.

9. The system according to claim 1, wherein:
the parent virtual interface is associated with a context in a hardware context table, and at least one child virtual interfaces is not associated with any context in the hardware context table.

10. A method for supporting a flooding mechanism in a middleware machine environment operable on one or more microprocessors, comprising:
receiving at least one packet via an external port at a gateway instance from an external network, wherein the at least one packet is specified with an unknown destination address;
sending, via the gateway instance, the at least one packet to a multicast group; and
forwarding, via the multicast group, the at least one packet to one or more host servers in the multicast group;
wherein said one or more host servers include a plurality of virtual interfaces;
wherein at least one virtual interface is configured as a parent virtual interface that is associated with one or more child virtual interfaces;
wherein each said host server is associated with one or more virtual machines that operate to process the at least one data packet; and
wherein policy information associated with the parent virtual interface on the gateway instance limits addresses and/or identifications with which the one or more child virtual interfaces can be associated.

11. The method according to claim 10, further comprising:
providing a hardware context table that contains a plurality of contexts that can be associated with one or more said virtual interfaces.

12. The method according to claim 11, further comprising:
determining, via the gateway instance, whether an incoming packet received at the external port specifies a virtual interface that is associated with a context in the hardware context table.

13. The method according to claim 12, further comprising:
receiving the incoming packet at the external port that is considered to have an unknown destination address when the incoming packet is destined for a virtual interface that is not associated with any context in the hardware context table.

14. The method according to claim 10, further comprising:
allowing the multicast group to include all hosts and/or hypervisors that share the gateway instance, and the at least one packet is replicated to all cooperating host servers.

15. The method according to claim 10, further comprising:
allowing, via the gateway instance, one or more associated hosts and/or hypervisors to register with the multicast group.

16. The method according to claim 10, further comprising:
associating at least one said virtual machine on a host server with multiple virtual interfaces, and wherein the multicast group operates to forward multiple copies of the at least one packet to the at least one said virtual machine.

17. The method according to claim 16, further comprising:
allowing the at least one said virtual machine to filter out additional copies of the at least one packet.

18. The method according to claim 10, wherein:
the parent virtual interface is associated with a context in a hardware context table, and at least one child virtual interfaces is not associated with any context in the hardware context table.

19. A non-transitory machine readable storage medium having instructions stored thereon for supporting flooding mechanism in a middleware machine environment that when executed cause a system to perform the steps comprising:
receiving at least one packet via an external port at a gateway instance from an external network, wherein the at least one packet is specified with an unknown destination address;
sending, via the gateway instance, the at least one packet to a multicast group; and
forwarding, via the multicast group, the at least one packet to one or more host servers in the multicast group;
wherein said one or more host servers include a plurality of virtual interfaces;
wherein at least one virtual interface is configured as a parent virtual interface that is associated with one or more child virtual interfaces; and
wherein each said host server is associated with one or more virtual machines that operate to process the at least one data packet; and
wherein policy information associated with the parent virtual interface on the gateway instance limits addresses and/or identifications with which the one or more child virtual interfaces can be associated.

* * * * *

UNITED STATES PATENT AND TRADEMARK OFFICE
CERTIFICATE OF CORRECTION

PATENT NO. : 9,054,886 B2
APPLICATION NO. : 13/546217
DATED : June 9, 2015
INVENTOR(S) : Johnsen et al.

Page 1 of 1

It is certified that error appears in the above-identified patent and that said Letters Patent is hereby corrected as shown below:

In the specification

Column 1, line 67, delete "Forschungszcntrum" and insert -- Forschungszentrum --, therefor.

Column 6, line 50, delete "harware contect" and insert -- hardware context --, therefor.

Signed and Sealed this
Sixteenth Day of February, 2016

Michelle K. Lee
*Director of the United States Patent and Trademark Office*